United States Patent
Montgomery

(10) Patent No.: US 6,457,660 B1
(45) Date of Patent: *Oct. 1, 2002

(54) PROCESS FOR REMOVING PAINT FROM POLYMERIC MATERIALS

(76) Inventor: Michael Montgomery, 4870 Bagley Terrace Dr., Alpharetta, GA (US) 30004

( * ) Notice: Subject to any disclaimer, the term of this patent is extended or adjusted under 35 U.S.C. 154(b) by 0 days.

This patent is subject to a terminal disclaimer.

(21) Appl. No.: 09/659,185

(22) Filed: Sep. 12, 2000

Related U.S. Application Data

(62) Division of application No. 09/374,777, filed on Aug. 16, 1999, now Pat. No. 6,138,929.

(51) Int. Cl.7 ............................................... B02C 19/12
(52) U.S. Cl. ...................................... 241/60; 241/260.1
(58) Field of Search ........................... 241/20, 21, 24.1, 241/24.18, 27, 29, 260.1, 60; 209/3

(56) References Cited

U.S. PATENT DOCUMENTS 5,566,889 A * 10/1996 Preiss ........................... 241/19
6,138,929 A * 10/2000 Montgomery ................ 241/20

* cited by examiner

*Primary Examiner*—Mark Rosenbaum
(74) *Attorney, Agent, or Firm*—Samuels, Gauthier & Stevens

(57) ABSTRACT

A system for the separation of a coating from a coated polymeric material which comprises means for extruding the coated polymeric material to separate the coating from the polymeric material to form a mixture of separated polymeric material and the coating, means for placing the mixture in a fluid medium, means for effecting a separation of the polymeric material from the coating material and means for recovering the polymeric material separately from the coating material.

7 Claims, 1 Drawing Sheet

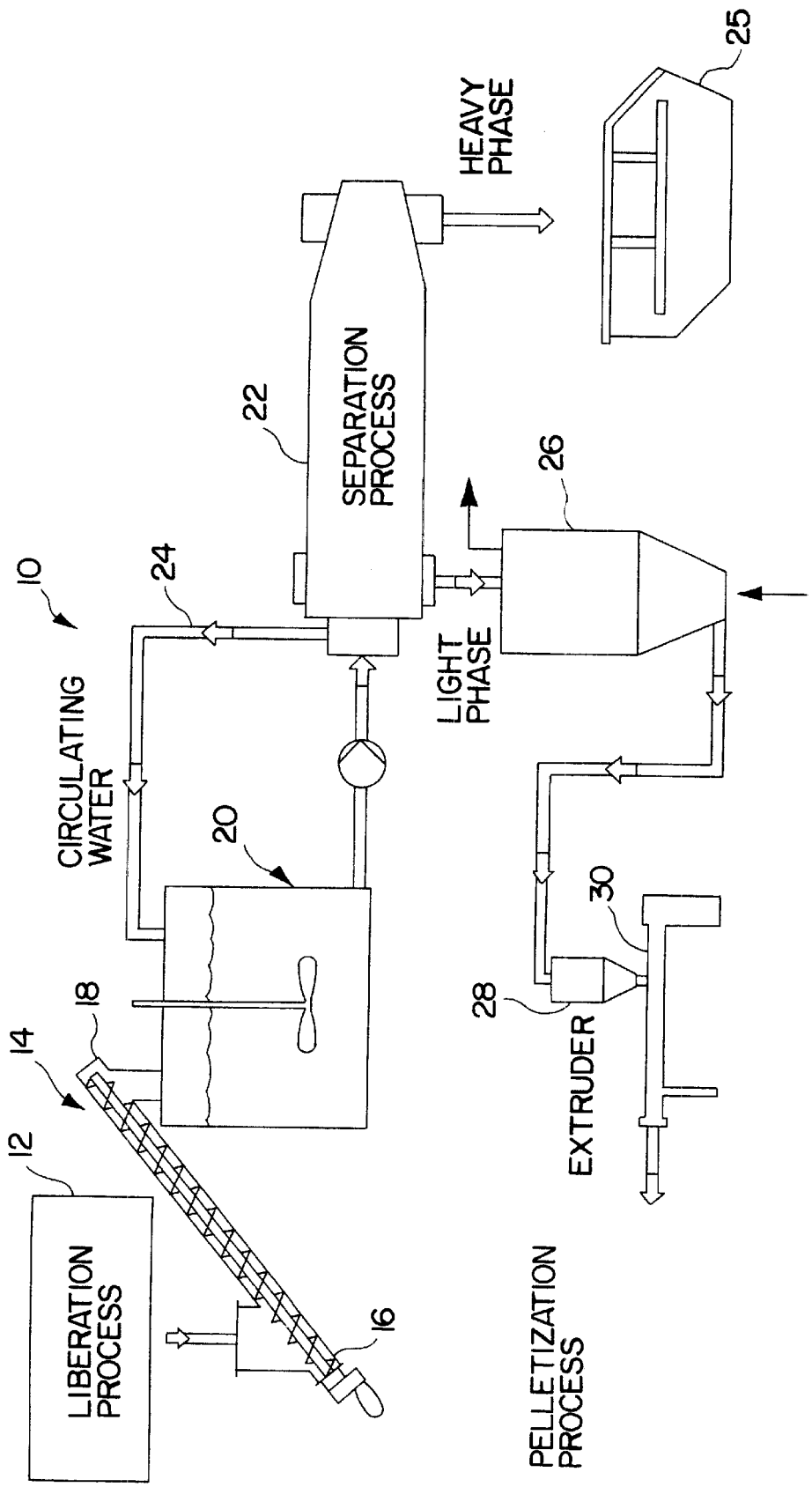

PROCESS FOR REMOVING PAINT FROM POLYMERIC MATERIALS

CROSS-REFERENCE TO RELATED APPLICATION(S)

This application is a divisional application of U.S. patent application Ser. No. 09/374,777 filed Aug. 16, 1999, now U.S. Pat. No. 6,138,929 issued Oct. 31, 2000.

BACKGROUND OF THE INVENTION

1. Field of the Invention

The invention relates to a system and process for removing paint from polymeric surfaces. The polymeric material is recycled.

2. Discussion of the Relevant Art

There are many processing operations where polymeric materials are coated with a film, sticker or other surface such as paint for industrial applications. As with any large scale processing operation, there inevitably will be a percent of 'rejects' based on inferior surface or paint quality or improper color. Due to the integral relationship of the paint and the plastic, these products are normally scraped and disposed of in landfills or occasionally recycled in a low-end application where the new part is not painted or coated. If the material is recycled (ground and extruded through a screen and ten remolded) small paint particles remain in the plastic and migrate to the surface during processing. These particles then create craters or bulges in the paint, thus developing another scrap part. Used polymers have hitherto been burned in an incinerated or buried together with other wastes under the ground. Combustion of such polymers increases carbon dioxide concentration in the are, leading to the serious problem of global warming. When they are buried under the ground, they cannot be decomposed by microorganisms and hence remain as they are, so that the amount of the polymers accumulated under the ground increases year by year.

In recent years, recycling of polymers has been advocated from the viewpoint of resource conservation and the earth's environmental protection.

However, various difficult problems should be solved in order to successfully recycle used polymers.

One of such problems is related to the fact that polymers as final products often are a composite of dissimilar materials, rather than a product of a single material. When such polymers as a composite are recycled without separation of the dissimilar materials, the recycled products often have inferior mechanical properties and appearance to those of the original polymers.

For example, when a coated polymer product, as such, is pulverized, repelletized with a pellet mill, pelletizer or heated extruder and remolded by means of a molding machine into a recycled polymer product, the coating which has been applied on the surface of the original polymer product remains in the recycled polymer product without being finely dispersed therein. Since the coating that cannot be finely dispersed inhibits homogenous blending of resins, the properties of the recycled product is considerably lowered.

Thus, it is of most importance to remove a coating from a coated polymer product in advance of its reprocessing for recycling.

One major area for the recycling of such a product is in the automotive industry for painted bumpers. These bumpers are typically a polymeric material having a paint applied thereto such that the bumper matches the color of the automobile.

Historically, recycling attempts have been made to simply melt the material down in a heated extruder, and capture the remaining paint particle contaminates in a screen or screen pack. This can be accomplished through a single screen pack or lining up multiple screens joined by a heated pump. Once the material has been through this type system, it might even be mixed with a similar clean material (copolymer in the auto bumper application) to reduce the amount of any remaining paint particles that have not been captured by the screening any dilution with the copolymer. This type system has proven to be slow and costly due to the high cost of good material that is used to dilute the subsequent recycled material.

Other approaches include chemically removal where parts or ground particles are treated with caustic chemicals that corrode the paint surface. This type process also has an adverse effect on the remaining plastic material that makes it difficult for reuse.

U.S. Pat. Nos. 5,788,811; 5,876,557 and 5,897,820 are all directed to the recycling of rejected polymeric materials having paint on the surface thereof each concentrating mainly on bumper parts. The objective of each of these patents is to separate the paint from the polymeric material whereby the polymeric material may be recycled.

In each of these patents, the primary mechanism by which the paint is removed is to shear or strip the paint from the underlying polymeric material by passing cut sections of the painted polymeric parts through a series of forming and shearing rolls, the shearing rolls having different peripheral speeds. This results in polymer strips that are then ground into smaller particles and subsequently melted down to make pellets for shipping or placed directly into a molding machine to form new parts.

Although not described in these references, a problem with this process is the efficient separation of the paint from the polymeric strips. That is, after the paint shearing step, basically there is an intimate mixture of residual paint particles that may adhere to the polymeric strips and subsequent particles. These paint particles adhere to the plastic by electrostatic bonds that are generated in any shearing or grinding process with plastics.

Also, these processes are labor intensive requiring parts be cut into sections and then fed into a series of rollers. Adding further to costs, parts must be handled initially in their "whole" state, requiring large volumetric logistics (large areas for shipping and/or material handling).

BRIEF SUMMARY OF THE INVENTION

The present invention is directed to a mechanical process and system for the separation of any coating, e.g. paint, from a polymeric material.

The present invention embodies a different step for the separation of a coating from polymeric material when compared to prior art processes. In one embodiment, the painted polymeric material is first ground for ease of material handling and then shredded in a cooled screw-type extruder. This removes the paint from the polymeric material. The invention includes additional steps for the efficient separation of paint particulates from the polymer material mix.

Broadly, the invention comprises subjecting granulated painted polymeric material to a cooled shearing process to form shredded material. Preferably, a twin or single screw cooled type extruder is used to effect this separation. This is a distinct step from shearing the paint from the polymeric material as described in prior art processes and differs in other extrusion processes by cooling the extruder to maintain a solid media and promote shearing and shredding instead of the traditional heating of the extruder to melt down the plastic. The shredded material is mixed with water to form a slurry. Surface active agents are added to the slurry to effect a phase separation between the mix of polymeric particles and the paint particles. Subsequently, the electrostatic bond between the paint and plastic particles is removed as well as promoting the paint particles to separate from the plastic by density classification in the slurry. The shredded polymeric particles are subsequently recycled.

The invention, in one aspect, comprises shearing the material in a cooled single or multiple screw extrusion-like process to separate the paint from the polymeric material. Preferably, in this aspect of the invention, the clearance between the outer periphery of the rotating screw(s) diminishes from the upstream to the downstream end, which clearance is defined by the inner surface of a water cooled jacket wall and the outer periphery of the moving screw. This process keeps the plastic from reaching a melt state (Tm) or becoming viscous. Since the particles do not melt, the shearing action promotes a separation between the paint and the plastic.

Another aspect of the invention comprises a system which comprises means for separating paint from the surface of polymeric material to form a shredded material, means for segregating the polymeric material from the paint material and means for recovering the polymeric material.

A preferred embodiment of the invention comprises shredding granulated paint coated polymeric material to form a shredded material comprising the polymeric material and the paint, phase separating the polymeric material from the paint material, recovering the polymeric material and recycling the recovered polymeric material.

BRIEF DESCRIPTION OF THE DRAWING(S)

The FIGURE is a process flow diagram of a system embodying the invention.

DESCRIPTION OF THE PREFERRED EMBODIMENT(S)

Peeling of a Coating from Coated Polymers

Coated polymers

Coated polymers to be processed according to the present invention may be any polymer products having a coating partially or entirely on its surface. Such polymer products include not only those products which have once been used but also those products which were produced for some use, but have become unnecessary for some reasons, e.g. failure to meet the product specifications.

The above polymer products may be molded products in various forms, for example, automobile exterior parts, such as automobile bumpers, wheel caps and side mouls, automobile interior parts, such as instrument panels, levers and upholstery foam linings, and electric appliances, such as cleaners, washing machines, refrigerators, lighting equipments, computers and audio equipments, which are produced by molding of thermopolymer resins, according to various molding methods, such as injection molding, extruding, blow molding, transfer molding, thermoforming, rotomolding, and press molding. Coating are applied either in the mold or through a secondary application process.

Substrate

The substrate of the above polymer product may be made of any thermopolymer resin. Specific examples include olefin resins exemplified by ethylene resins, such as high-density polyethylene, medium-density polyethylene, low-density polyethylene and linear low-density polyethylene, and propylene resins, such as propylene homopolymer and propylene-ethylene block or random copolymer, thermoplastic olefins, thermopolymer polyester resins, such as polyethylene terephthalate, polyester thermoplastics and polybutylene terephthalate, engineering resins, such as polyamides, polycarbonates, polyphenylene oxide, polyphenylene ether and polyoxymethylene, styrene resins, such as acrylonitrile-styrene copolymer and acrylonitrile-styrene-butadiene copolymer, acrylonitrile-styrene-butadiene, polybutadine-terephthalate, vinyl plastics, RIM materials or composites (including alloys) of the above resins but not excluding other plastics, modified plastics, rubbers, or modified rubber materials.

Among the above thermopolymer resins, olefin resins and composites containing olefin resins are preferred, and ethylene-propylene-diene monomer resins or other blends with propylene as a base material are particularly preferred.

These substrates of coating polymers may also comprise additional component besides the above thermopolymer resins, for example, inorganic fillers, such as talc, glass fiber, titanium oxide and carbon, rubbers, such as natural rubber, ethylene-propylene copolymer rubber, styrene-butadiene rubber, styrene-isoprene rubber, acrylonitrile-butadiene rubber, isoprene rubber, urethane rubber and hydrogenated styrene-diene block copolymer, and pigments, such as quinacridone and ferrocyanine blue.

Coating

Primer

The coated polymer products to be processed according to the present invention may have a coating either directly on the substrate or via a primer layer.

Examples of the primer include modified propylene resins, such as chlorinated polypropylene resin and maleic acid-modified polypropylene, styrene-ethylene-butylene-styrene copolymer (SEBS copolymer) and styrene-ethylene-propylene-styrene copolymer (SEPS copolymer). Among them, chlorinated polypropylene resin is preferred.

These primers re used so as to form a primer layer having a thickness generally in the range of from 3 to 30 $\mu$m, preferably in the range of from 5 to 15 $\mu$m.

Paint

As a paint or coating which is applied on a partial or the entire surface of the substrate of polymer product to form a coating, mention may be made of organic solvent-based paints, water-soluble resin paints, water-dispersible resin paints and aqueous emulsion paints, including coatings used for aesthetics, noise or vibration damping, corrosion resistance, flame or fire retardants or EMI/FRI shielding or any other type of protective, functional or aesthetic coating or film.

Specific examples of such paints include paints comprising a resin component of an acryl, epoxy, polyester or alkyd resin and a crosslinking component of a urethane or melamine compound. Among others, paints comprising a resin component of an acrylic or polyester resin and a crosslinking component of a melamine or urethane compound (isocyanate crosslinking type) are preferred.

The paint may be used to form a coating having a thickness generally in the range of from 20 to 200 $\mu$m, preferably in the range of from 30 to 100 $\mu$m, and the amount of the paint used is generally not more than 10% by weight, preferably 7% by weight, based on the substrate.

The invention will be described with reference to specific equipment, particle sizes and the like. However, it is understood that the following is only exemplary of the invention and that other process control equipment to effect the same or similar steps as described can be successfully employed as will be well understood by one skilled in the art.

EXAMPLE

A system exemplary of the preferred embodiment of the invention is shown generally at 10 and comprises a hopper 12 which contains granulated bumper waste material, namely a polymeric material coated with paint ground to pellets of ¼" to ¾". A typical polymeric bumper material would be a thermoplastic olefin or elastomer and a typical paint would be an acrylic water-based or solvent-based paint.

The pellets from the hopper 12 are introduced by auger or gravity flow into the upstream end 16 of a single or multiple screw cooled extruder 14. A particularly preferred extruder is one such as available from Gaia RoKel tradename Roto Dispegator or extruders such as disclosed or in accordance with previous U.S. Pat. Nos. 4,118,163; 4,875,847; 5,415,354; 5,704,555; 5,743,471 or 5,769,335. This type of extruder is distinguished by use of a rotating screw(s) contained inside of a cooled barrel or jacket. The screw(s) likewise may be cooled, or coolant introduced with the material as long as the material temperature is held below the melting point so that the extruder has a shearing effect on the material instead of a melting effect. Typically, the material travels from the upstream end 16 to the downstream end 18 at a rate determined by the size gap allowing material output. The material is discharged as shredded material, having a particle size from a few microns to the original size of the granulate going into the upstream end of the process. The shredded mix of plastic and paint particles pass from the downstream end 18 of the extruder 14 into a mixing pre-treatment tank 20.

In a continuous or batch process, the volume of the water in the mixing tank 20 is generally maintained at 4,000 liter and typically there is about 300 to 400 Kg, preferably about 345 Kg of shredded material. The shredded material is added in the tank forming a slurry. A surfactant is added in an amount of between 280–330 ppm, e.g. 312 ppm. A preferred surfactant is BetzSolv® 203a, Betz Dearborn. Optionally, a flocculent such as a parifinic distillate ionic emulsion is added in an amount of between 10 to 20 ppm, e.g. 15 ppm. A preferred flocculent polymer 4425L, Betz Dearborn. The slurry with the additives is mixed with a rotating blade. This evenly disperses the surfactant and affects the static bond between the paint and the polymer. The surfactant neutralizes the static charged paint particles and allows these particles to fall free from the polymeric particles. Flocculent, when used, acts to effect liquid separation of the materials based on their density.

The slurry is then pumped to a mechanical separator 22, the light phase polymeric material is separated from the heavy phase paint particles and the water is recycled back to the mixing tank 20. A suitable system for effecting the separation as just described is a Krauss Maffei tradename Flottweg Sorticanter® Centrifuge. The heavy phase paint particles are collected in a bin 24 for further environmental treatment. The polymeric particles are discharged to a dryer 26, either air, heat or compression and transferred to a hopper 28 where they are discharged into an extruder 30.

Further, although the phase separation process has been described with reference to certain surfactants and optionally flocculent, depending upon the shredded materials to be segregated, whether they are bonded by static charge, e.g. high surface tensions, or ionic bonding, will determine the specific surface active agent(s) and amount which would be most suitable for the separation process.

Although described in reference to a slurry, it is within the scope of the invention that depending upon the specific polymeric materials being separated from the coating on said material, the shredded material may be placed in solution, suspension, emulsion, colloidal dispersion or a slurry.

Lastly, the characteristics of the separated materials will determine if there is a light phase to be separated from a heavy phase with water recycled to a mixing tank. That is, it may be more appropriate to separate one material from the water phase while that water phase retains the other material and then subsequently separate the other material from the water phase.

The foregoing description has been limited to a specific embodiment of the invention. It will be apparent, however, that variations and modifications can be made to the invention, with the attainment of some or all of the advantages of the invention. Therefore, it is the object of the appended claims to cover all such variations and modifications as come within the true spirit and scope of the invention.

Having described my invention, what I now claim is:

1. A system for the separation of a coating from a polymeric material which comprises:

means for extruding the coated polymeric material to separate the coating from the polymeric material to form a mixture of separated polymeric material and the coating;

means for placing the mixture in a fluid medium;

means for effecting a separation of the polymeric material from the coating material; and means for recovering the polymeric material separately from the coating material.

2. The system of claim 1 wherein the means for extruding comprises a screw cooled extruder.

3. The system of claim 2 wherein the extruder is a single screw extruder.

4. The system of claim 3 which further comprises:

means for collecting the coating; and means for drying and recycling the polymeric material.

5. The system of claim 2 wherein the extruder is a multiple screw extruder.

6. The system of claim 2 wherein the separated polymeric material and the coating are discharged as shredded material and which further comprises forming a slurry of the shredded material to separate the polymeric material from the coating.

7. The system of claim 1 which further comprises:

means for pelletizing the coated polymeric material prior to extruding the material.

* * * * *